(12) United States Patent
Kostov et al.

(10) Patent No.: US 10,222,506 B2
(45) Date of Patent: Mar. 5, 2019

(54) SYSTEM AND METHODOLOGY FOR ORIENTATION OF A BOREHOLE SEISMIC SOURCE

(71) Applicant: Schlumberger Technology Corporation, Sugar Land, TX (US)

(72) Inventors: Clement Kostov, Houston, TX (US); Martin G. Luling, Paris (FR); Mark Puckett, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 539 days.

(21) Appl. No.: 14/847,004

(22) Filed: Sep. 8, 2015

(65) Prior Publication Data
US 2016/0091626 A1 Mar. 31, 2016

Related U.S. Application Data

(60) Provisional application No. 62/055,609, filed on Sep. 25, 2014.

(51) Int. Cl.
*G01V 11/00* (2006.01)

(52) U.S. Cl.
CPC .................... *G01V 11/00* (2013.01)

(58) Field of Classification Search
CPC ...... G01V 11/00; G01V 1/306; G06T 7/0038; G01R 31/2822
USPC ....... 324/314, 323, 324–368, 221, 637, 639, 324/676, 76.11–76.77, 250, 710, 500, 324/754.06, 754.31
See application file for complete search history.

(56) References Cited

U.S. PATENT DOCUMENTS

2004/0223410 A1* 11/2004 West et al. ............... G01V 1/40
367/25

FOREIGN PATENT DOCUMENTS

WO 2014/105503 7/2014

\* cited by examiner

*Primary Examiner* — Melissa Koval
*Assistant Examiner* — Trung Nguyen
(74) *Attorney, Agent, or Firm* — Eileen Pape

(57) ABSTRACT

A technique generates seismic data that may be analyzed. A combination sensor is operated and deployed in a borehole to obtain orientation data, such as data related to the local magnetic field and a log of the magnetic field direction in the borehole. Following the combination sensor, at least one multi-component seismic source is deployed downhole into the borehole. The at least one multi-component seismic source comprises sensors, such as an inclinometer and a magnetometer. Data from the combination sensor and from the at least one multi-component seismic source is processed to determine an absolute orientation of the at least one multi-component seismic source.

11 Claims, 3 Drawing Sheets

SYSTEM AND METHODOLOGY FOR ORIENTATION OF A BOREHOLE SEISMIC SOURCE

CROSS REFERENCE TO RELATED APPLICATIONS

This is a non provisional patent application of co-pending U.S. provisional patent application Ser. No. 62/055,609 to Clement Kostov, et al filed on Sep. 25, 2014, which is hereby incorporated in its entirety for all intents and purposes by this reference.

BACKGROUND

Hydrocarbon fluids such as oil and natural gas are obtained from a subterranean geologic formation, referred to as a reservoir, by drilling a well that penetrates the hydrocarbon-bearing formation. Knowing where the reservoir is located or the type of geological formation containing the reservoir is valuable in determining where to drill and in deciding what well servicing treatments may be desired to efficiently produce a reservoir. One method of mapping the area around a borehole uses seismic source signals and seismic receivers. The seismic signals, e.g. acoustic signals, are generated by a seismic source or sources, and the signals then travel through the geological formations. The profiles of the seismic signals are altered by the formation prior to being received by the acoustic receivers. By processing the waveforms of the seismic signals detected by the receivers, a representative indication of the location, composition, and extent of various geological formations may be obtained. However, existing seismic systems do not adequately orient polar seismic sources in space. Similarly, such existing seismic systems are inadequate with respect to monitoring or determining the orientation of the seismic sources.

SUMMARY

In general, a system and methodology are provided for generating seismic data that may be analyzed. A combination sensor is operated and deployed in a borehole to obtain orientation data, such as data related to the local magnetic field and a log of the magnetic field direction in the borehole. Following the combination sensor, at least one multi-component seismic source is deployed downhole into the borehole. The at least one multi-component seismic source comprises sensors, such as an inclinometer and a magnetometer. Data from the combination sensor and from the at least one multi-component seismic source is processed to determine an absolute orientation of the at least one multi-component seismic source.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
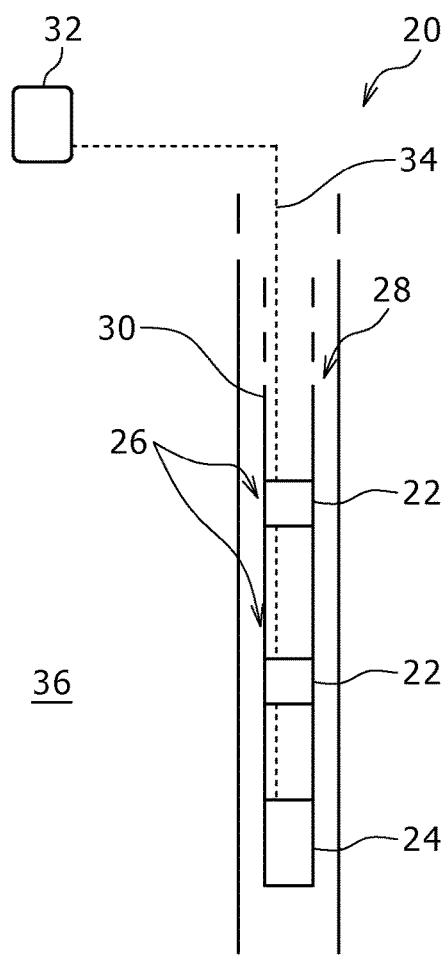
FIG. 1 is a schematic illustration of an example of a borehole seismic system, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which facilitate the generation and analysis of seismic data to enable orientation of borehole seismic sources. The orientation of a borehole seismic source may be accomplished physically by actual physical adjustment of the borehole seismic source or through manipulation of data. For example, data may be obtained (as described in greater detail below) and inverted to effectively "rotate" the seismic source to a true up-down, true North-South, and true East-West orientation within, for example, a data conditioning algorithm or inversion algorithm.

According to an embodiment, a combination sensor is operated and deployed in a borehole to obtain orientation data, such as data related to the local magnetic field and a log of the magnetic field direction in the borehole. Following the combination sensor, at least one multi-component seismic source is deployed downhole into the borehole. The at least one multi-component seismic source may be deployed downhole separately from the combination sensor or concurrently. When deployed concurrently, the multi-component seismic source may be deployed following the combination sensor on a common conveyance. The at least one multi-component seismic source comprises sensors, such as an inclinometer and a magnetometer. Data from the combination sensor and from the at least one multi-component seismic source is processed via a computer-based control system or other suitable control system to determine an absolute orientation of the at least one multi-component seismic source. In various applications, the seismic source comprises an array of multi-component seismic sources.

Each seismic source may comprise an acoustic source operated in a borehole to generate elastic waves which may have non-isotopic radiation patterns. For example, transverse dipole sources, as used in sonic or cross-well applications, generate shear waves whose energy and polarization vary with azimuth and polar angles. Embodiments described herein enable control over the orientation of the sources in both open and cased boreholes. To obtain desired data on the orientation of the sources, the absolute orientation of a given tool, e.g. seismic source, may be determined. In other words, the absolute orientation of the borehole seismic source may be determined versus vertical and the North-South direction rather than just being determined relative to the borehole axis. In cased boreholes the earth magnetic field may not be suitable for a reliable North-South determination due to random magnetization of the casing, so gyroscopes or other devices/techniques may be employed to determine the North-South direction as described in greater detail below.

In certain applications, multi-component seismic sources may be used to perform desired borehole seismic services. In these and other applications, radiation patterns of the different elastic waves generated by the seismic sources make it desirable to know the orientation of the seismic source or sources for measurements and evaluations of data. For example, a transverse dipole source may generate shear waves in the plane perpendicular to the borehole axis. In this type of application, the orientation of each multi-component seismic source should be determined and controlled. Determining the orientation of each multi-component seismic source can be accomplished by establishing the absolute direction of up-down and North-South at each desired point/location along the well trajectory. According to embodiments described herein, the absolute direction of up-down, North-South, and East-West can be detected and established with the aid of a combination sensor deployed into the borehole ahead of the seismic source or sources.

Referring generally to FIG. 1, an example of a borehole seismic system 20 is illustrated. In this example, borehole seismic system 20 comprises at least one multi-component seismic source 22 and a combination sensor 24. The at least one multi-component seismic source 22 may comprise a plurality of the seismic sources 22 arranged in an array 26. The at least one seismic source 22 and the combination sensor 24 are deployed downhole into a borehole 28 via a suitable conveyance 30, such as a cable conveyance or a coiled tubing conveyance. In the example illustrated, the combination sensor 24 is used to measure a local magnetic field against geographic North-South and to obtain a log of the magnetic field direction along the borehole 28. The combination sensor 24 is deployed downhole ahead of the at least one multi-component seismic source 22 and may be conveyed concurrently with the at least one seismic source 22 or in a separate trip downhole. By way of example, the combination sensor 24 and the array 26 of multi-component seismic sources 22 may be deployed downhole into borehole 28 via a common conveyance 30.

As illustrated, the multi-component seismic sources 22 and the combination sensor 24 are placed in communication with a control system 32. The control system 32 may be a computer-based control system or other suitable control system configured to process seismic data received from seismic sources 22 and combination sensor 24. The multi-component seismic sources 22 and the combination sensor 24 may communicate with control system 32 via a communication line or lines 34. The communication line or lines 34 may comprise hardwired communication lines and/or wireless communication lines depending on the configuration of the overall borehole seismic system 20.

The multi-component seismic sources 22 also may be actuated under the control of control system 32 to initiate seismic signals which are sent into a surrounding formation 36. As with other types of seismic systems, the acoustic signals generated by the multi-component seismic source or sources 22 travel through the formation 36 and may be reflected to or otherwise travel to corresponding seismic receivers. The waveforms of the seismic signals detected by the receivers may be processed to gain knowledge regarding the location, composition, and extent of various geological features of the formation 36.

Figure 2:
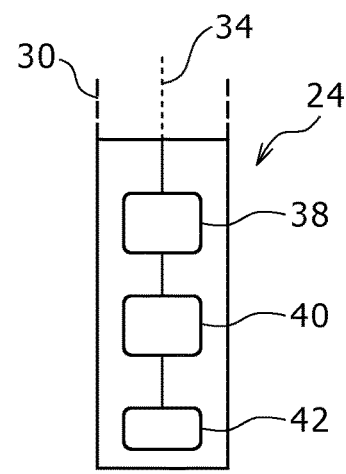
FIG. 2 is a schematic illustration of an example of a combination sensor which may be used in the borehole seismic system, according to an embodiment of the disclosure.

Referring generally to FIG. 2, an example of the combination sensor 24 is illustrated. In this embodiment, the combination sensor 24 comprises a plurality of sensors for determining orientation. For example, the combination sensor 24 may comprise an inclinometer 38, such as a triaxial accelerometer, and a magnetometer 40, such as a triaxial magnetometer. In this embodiment, the combination sensor 24 further comprises a gyroscope 42 which may be pre-calibrated at the surface of the earth in the true geographic North-South direction.

Figure 3:
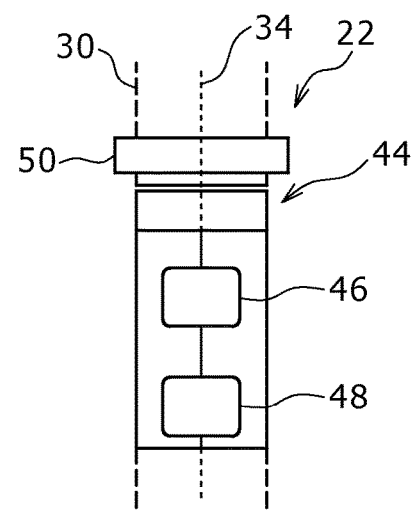
FIG. 3 is a schematic illustration of an example of a multi-component seismic source having a sensor system for determining orientation, according to an embodiment of the disclosure.

Referring generally to FIG. 3, an example of one of the multi-component seismic sources 22 is illustrated. In this embodiment, the seismic source 22 comprises a signal generator 44, e.g. a multi-component signal generator, which may be operated via control system 32 to generate elastic waves which propagate through formation 36. Additionally, the seismic source 22 comprises a plurality of sensors which may include a source inclinometer 46, e.g. a triaxial accelerometer, and a source magnetometer 48, e.g. a triaxial magnetometer. In some applications, data provided to control system 32 is inverted to effectively "rotate" the seismic source to a true up-down, true North-South, and true East-West orientation within, for example, a data conditioning algorithm or inversion algorithm. Various algorithms and/or software modules may be programmed into or downloaded onto control system 32 to enable the inversion of data (or other processing of data) to determine source orientation. However, some applications orient the borehole seismic source 22 by actual physical adjustment of the borehole seismic source via an orientation mechanism 50. The orientation mechanism 50 may comprise an actuator which engages the surrounding borehole wall and/or which uses offset weights or other internal mechanisms. By way of example, the orientation mechanism 50 may comprise hydraulic actuators, electric actuators, electro-mechanical actuators, and/or other suitable types of actuators to physically orient the borehole seismic source 22 within borehole 28. The orientation mechanism 50 may be controlled by control system 32.

In many types of applications, the multi-component seismic sources 22 may be used to generate shear waves in a variety of predetermined polarization directions relative to an axis of the borehole 28. In various well geometries, e.g. vertical, deviated, or directional well geometries, the accurate and reliable control over orientation of each seismic source 22 during deployment enables an improved collection and use of seismic data. For example, such controlled source orientation enables an optimal polarization choice for given measurement configurations and survey objectives.

As described herein, the multi-component seismic sources 22 may be oriented against true up-down, true North-South, and true East-West directions. In this context, true North-South is considered the geographic North-South direction rather than the magnetic North-South direction. In open boreholes, magnetic North-South could be measured with, for example, a triaxial magnetometer. However, in steel-cased wells such a magnetic field measurement can be unreliable. The steel casing tends to distort the earth magnetic field and may superimpose a local magnetic field from random pre-magnetization of the casing.

To avoid such distortion, the dedicated sensor combination of combination sensor 24 may be used to measure the vector-valued magnetic field inside the cased borehole 28 ahead of multi-component seismic sources 22. For example, the triaxial accelerometer 38 of combination sensor 24 may be used to measure a vector-valued gravitational force and thus the true up-down direction. In this example, the gyroscope 42 is pre-calibrated at the surface in the true geographic North-South direction and may also be calibrated in the true geographic East-West direction. The two sensors 38, 42 are aligned with triaxial magnetometer 46, and this multi-sensor array of combination sensor 24 is run downhole into the cased borehole 28. As the combination sensor 24 is run downhole, the local magnetic field is measured against the true up-down direction and the true North-South direction at point/locations along the axis of borehole 28, e.g. continuously along the axis of borehole 28. This effectively creates a log of the magnetic-field orientation along borehole 28.

After logging the magnetic-field orientation, the at least one multi-component seismic source 22 is moved along the borehole 28. In the illustrated example, the array 26 of multi-component seismic sources 22 is deployed downhole, and each seismic source 22 includes a package of sensors, such as the triaxial accelerometer 46 and the triaxial magnetometer 48. The triaxial accelerometer 46 provides an up-down direction vector. Additionally, the triaxial magnetometer 48 provides a local magnetic-field orientation vector which is also known from the earlier log. These two vectors are used to determine the geographic North-South direction vector locally. In some applications, a plurality of the multi-component seismic sources 22 is deployed into the borehole 28 with each multi-component seismic source 22 having the triaxial accelerometer 46 to provide an up-down vector and the triaxial magnetometer 48 to provide a local magnetic field orientation vector. The control system 32 may be used to process data regarding the up-down vector and the local magnetic field orientation vector for each seismic source 22 in determining the geographic North-South orientation for each multi-component seismic source.

The individual components of each multi-component seismic source 22 may be sequentially fired. With the source-orientation information obtained via combination sensor 24 and the sensors 46, 48 of each seismic source 22, the processor-based control system 32 may be used to process the data in a manner which explicitly "rotates" each seismic source 22 to a true up-down direction, true North-South direction, and true East-West direction within, for example, a data conditioning algorithm or inversion algorithm. In some applications, the source orientation information obtained by control system 32 from combination sensor 24 and seismic sources 22 may be used to physically alter the orientation of each seismic source 22. This physical orientation of each seismic source 22 may be accomplished using a downhole control system, e.g. orientation mechanism 50, with each seismic source 22 to rotate the seismic source 22 into a predetermined, desired orientation. Without the explicitly known source orientation based on the data obtained from combination sensor 24 and seismic sources 22, the set of unknowns would increase and the entire inversion of data would be rendered less accurate and more error-prone.

Figure 4:
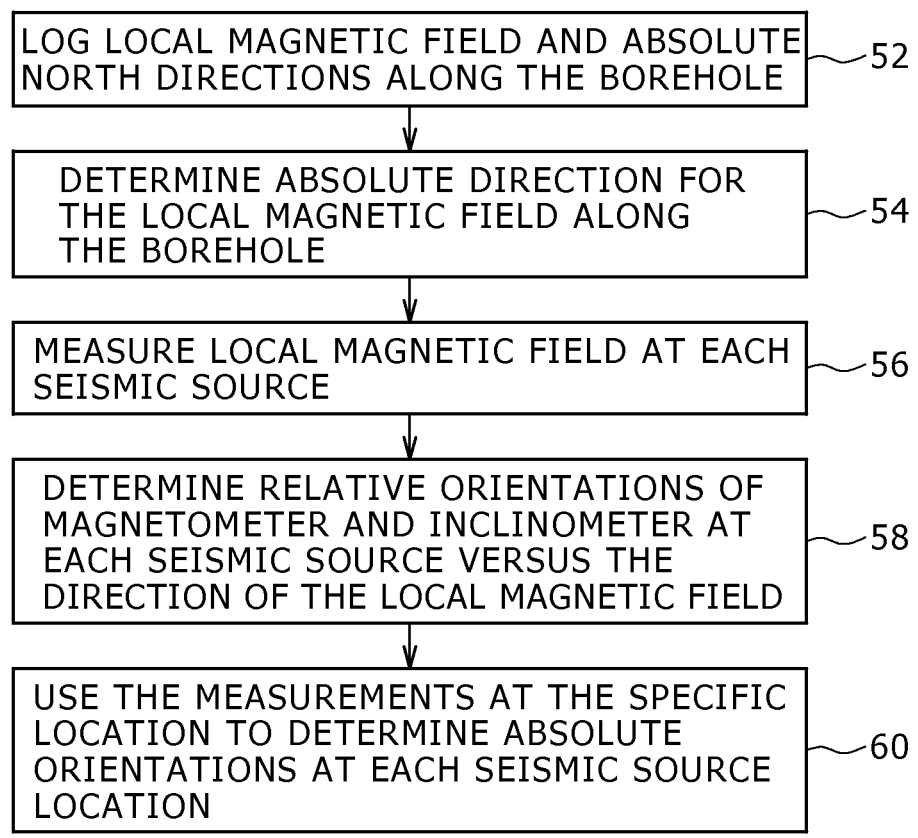
FIG. 4 is a flowchart illustrating an example of a procedure for determining orientation of borehole seismic sources, according to an embodiment of the disclosure.

Referring generally to FIG. 4, a flowchart is provided to illustrate an example of a procedure for determining orientation of borehole seismic sources 22. In this embodiment, the combination sensor 24 is used to log the local magnetic field and the absolute North-South direction along the borehole 28, as represented by block 52. By way of example, the combination sensor 24 servers to measure the vector-valued magnetic-field orientation against the true up-down direction from the vector-valued accelerometer measurement and the true North-South direction from the pre-calibrated, vector-valued gyroscope measurement. The log is created from this magnetic field measurement being performed at many points along the borehole, concatenating these measurements, and giving the magnetic-field orientation as a function of the borehole-depth position. Referring again to FIG. 4, the absolute direction for the local magnetic field along the borehole 28 is determined, as represented by block 54. As described above, the magnetometer 40 of combination sensor 24 may be used to measure the local magnetic field vector, and the gyroscope 42 may be used to determine the absolute North-South direction.

Subsequently, the local magnetic field at each seismic source 22 is measured, as represented by block 56. By way of example, the local magnetic field may be determined via suitable sensors, such as the triaxial magnetometer 48 located in each seismic source 22. The data from the triaxial magnetometer 48 and the triaxial accelerometer 46 of each multi-component seismic source 22 may be used to establish relative orientations at each seismic source 22 versus the direction of the local magnetic field determined by combination sensor 24, as represented by block 58. The measurements at the specific location of each seismic source 22 may be used to determine absolute orientations of each seismic source 22 at that specific location, as represented by block 60. With this known seismic source orientation, the inversion of seismic data becomes more accurate and less prone to error.

Figure 5:
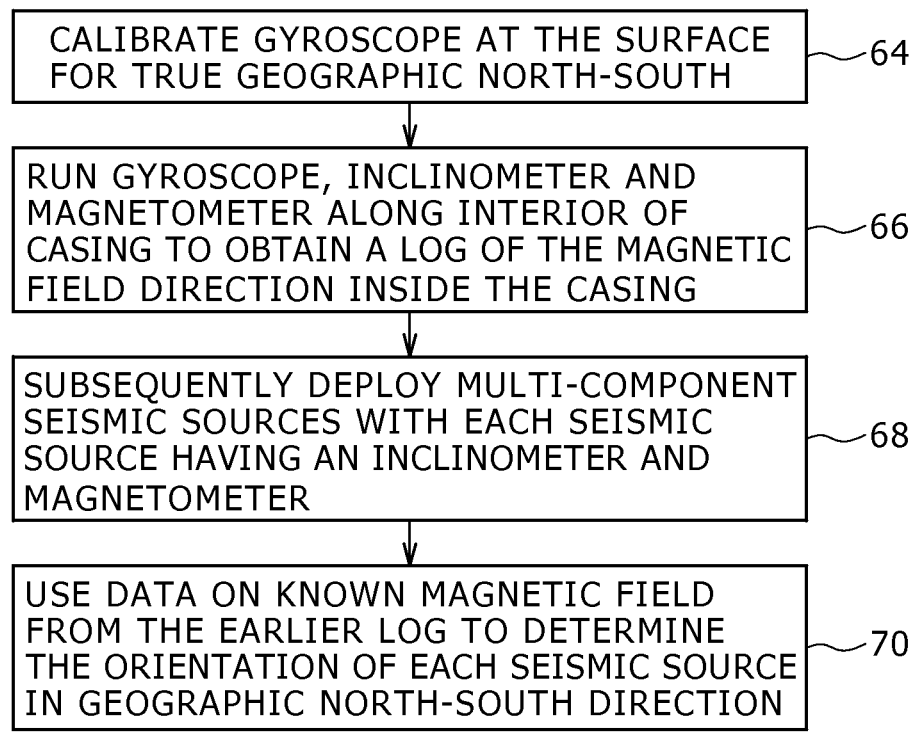
FIG. 5 is a flowchart illustrating an example of another procedure for determining orientation of borehole seismic sources, according to an embodiment of the disclosure.

Another procedure for determining orientation of borehole seismic sources 22 is illustrated by the flowchart of FIG. 5. In the embodiment of FIG. 5, the combination sensor 24 also comprises gyroscope 42 which may be calibrated at the surface for the true geographic North-South direction, as represented by block 64. The gyroscope 42, inclinometer 38, and magnetometer 40 of combination sensor 24 are then run downhole along the interior of the casing lined borehole 28, as represented by block 66. The combination sensor 24 is operated to obtain a log of the magnetic field direction inside the casing of borehole 28, and this data may be transmitted to control system 32. Subsequently, the array 26 of multi-component seismic sources 22 is deployed downhole into the cased borehole 28, as represented by block 68. In this embodiment, each seismic source 22 has a package of sensors including, for example, source inclinometer 46 and source magnetometer 48.

Data from both combination sensor 24 and the package of sensors in each seismic source 22 is transmitted to the control system 32 for inversion and/or other processing. Log data on the known magnetic field along borehole 28 obtained from combination sensor 24 may be used in combination with the data from each seismic source 22 to determine the orientation of each seismic source, as represented by block 70. For example, data on the known magnetic field from the earlier log and the data from the individual multi-component seismic sources 22 may be used to determine the orientation of each seismic source 22 in the geographic North-South direction. As described above, this data may then be used by control system 32 to improve the quality and usefulness of the overall seismic survey.

Depending on the specifics of a given application and/or environment, the procedure for obtaining orientation data from the combination sensor 24 and the individual seismic sources 22 may be adjusted. Additionally, various types of sensors and sensor packages may be used in both the combination sensor 24 and the individual multi-component seismic sources 22. Various types of control systems 32 may be employed and may be configured, e.g. programmed, with suitable inversion algorithms or other data manipulation algorithms which are able to obtain desired information from the seismic survey data. Additionally, individual seismic sources or arrays of seismic sources may have different types of signal generators used to generate seismic signals, e.g. waves, which are directed into the surrounding formation. Also, many types of geophones and other seismic receivers may be used to receive the seismic signals after passing through at least portions of the formation. The seismic receivers may be positioned in various arrays within the borehole, and/or along surface locations.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for determining orientation of a multi-component seismic source in a borehole, the method comprising:
    measuring local magnetic fields along an axis of a borehole against geographic North-South using a combination sensor to generate combination sensor data;
    after measuring the local magnetic fields along the axis of the borehole,
    measuring a local magnetic field at the multi-component seismic source using a triaxial sensor of the multi-component seismic source to generate multi-component seismic source sensor data; and
    determining, by executing an instruction with a processor, the orientation of the multi-component seismic source in a geographic North-South direction based on the combination sensor data and the multi-component seismic source sensor data.

2. The method as recited in claim 1, wherein the combination sensor includes a gyroscope, a triaxial accelerometer, and a triaxial magnetometer.

3. The method as recited in claim 2, wherein the multi-component seismic source includes a plurality of multi-component seismic sources.

4. The method as recited in claim 3, further comprising deploying the plurality of multi-component seismic sources and the combination sensor into the borehole concurrently via a single conveyance.

5. The method as recited in claim 2, further comprising calibrating the gyroscope at a surface location.

6. The method as recited in claim 1, further comprising performing a reverse vertical seismic profiling application using the multi-component seismic source.

7. The method as recited in claim 1, further comprising performing a cross well seismic application using the multi-seismic source.

8. The method as recited in claim 1, further comprising performing a sonic logging acquisition application using the multi-seismic source.

9. The method as recited in claim 1, further comprising deploying a plurality of the multi-component seismic sources into the borehole with each multi-component seismic source having a triaxial accelerometer to generate an up-down vector and a triaxial magnetometer to generate a local magnetic field orientation vector.

10. The method as recited in claim 9, further comprising determining the geographic North-South orientation of each multi-component seismic source based on the up-down vector and the local magnetic field orientation vector generated at each multi-component seismic source.

11. The method as recited in claim 2, further comprising deploying the multi-component seismic source and the combination sensor into a casing lining the borehole.

* * * * *